May 26, 1970     R. W. TRIPP     3,514,775
DIGITAL-TO-ANALOG CONVERTER
Filed June 12, 1967     14 Sheets-Sheet 1

INVENTOR
Robert W. Tripp
BY Pennie, Edmonds,
Morton, Taylor and Adams
ATTORNEYS

May 26, 1970   R. W. TRIPP   3,514,775
DIGITAL-TO-ANALOG CONVERTER
Filed June 12, 1967   14 Sheets-Sheet 13
FIG. 14
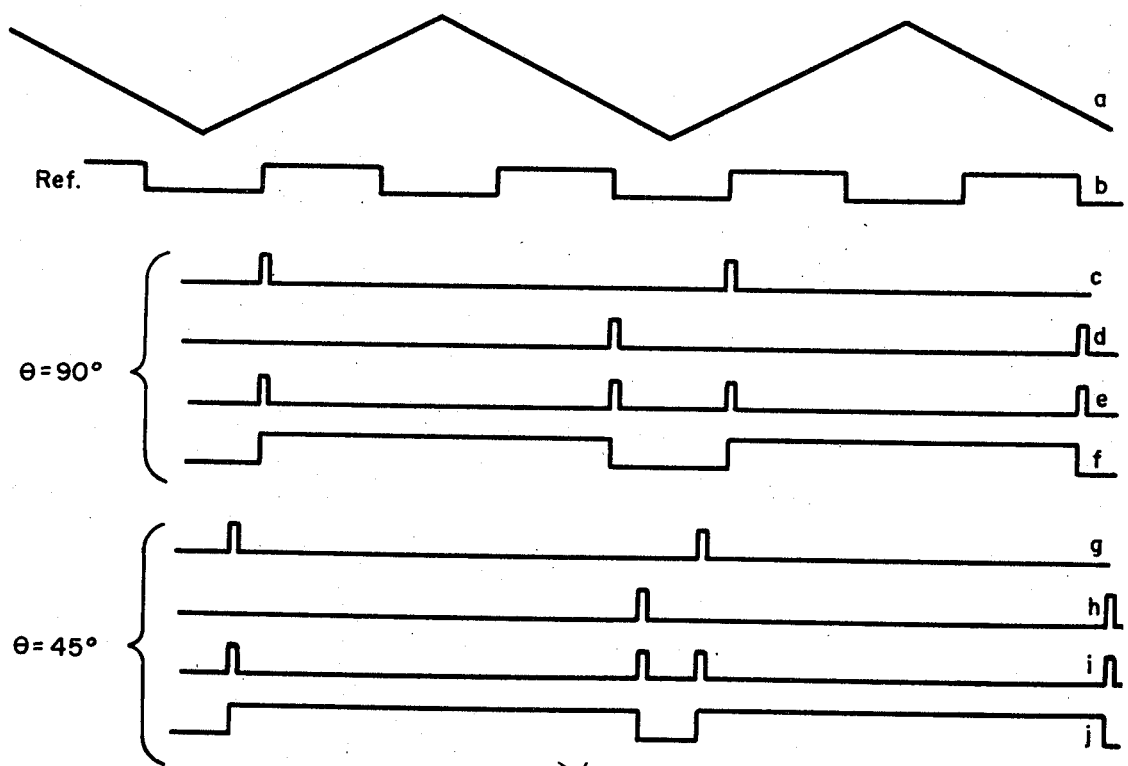
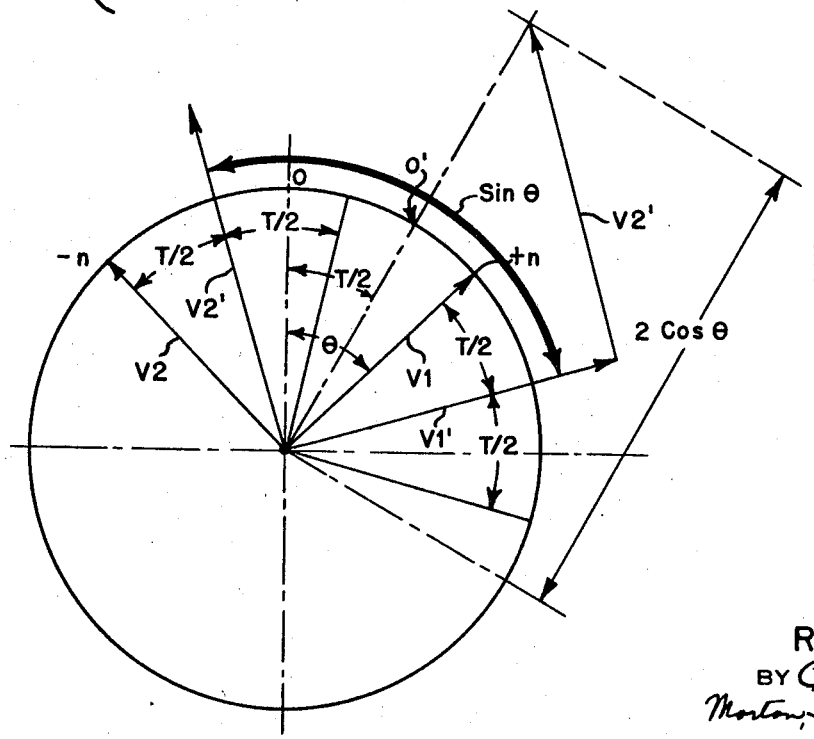
FIG. 15
INVENTOR
Robert W. Tripp
BY Jennie Edmonds,
Morton, Taylor and Adams
ATTORNEYS May 26, 1970     R. W. TRIPP     3,514,775
DIGITAL-TO-ANALOG CONVERTER
Filed June 12, 1967     14 Sheets-Sheet 14
FIG. 17
FIG. 16
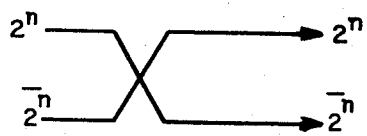
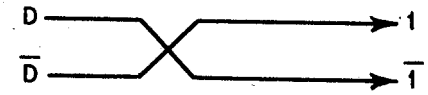
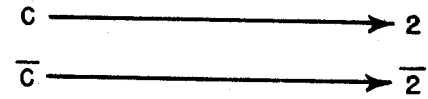
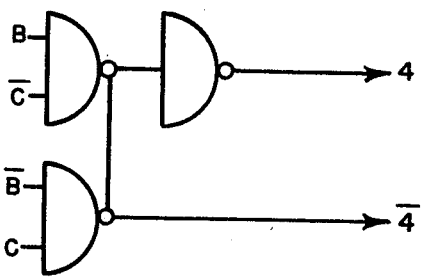
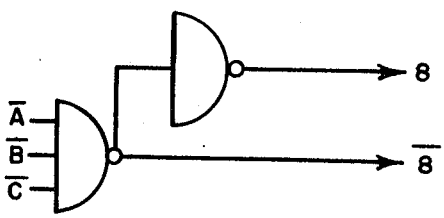
FIG. 18     FIG. 19
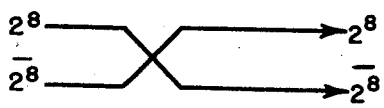     
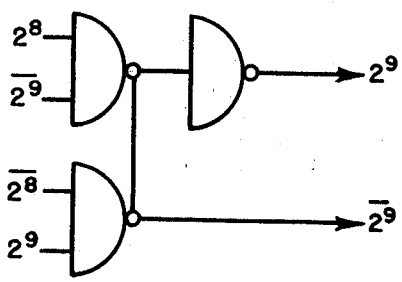     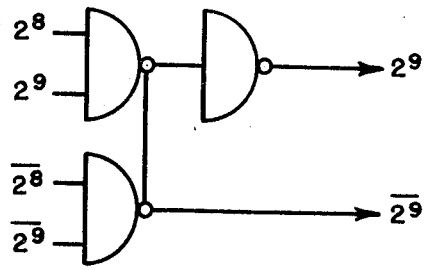
INVENTOR
Robert W. Tripp
BY *Pennie, Edmonds,*
*Morton, Taylor and Adams*
ATTORNEYS United States Patent Office 3,514,775
Patented May 26, 1970

3,514,775
DIGITAL-TO-ANALOG CONVERTER
Robert W. Tripp, New Rochelle, N.Y., assignor to Inductosyn Corporation, Carson City, Nev., a corporation of Nevada
Filed June 12, 1967, Ser. No. 645,161
Int. Cl. H03k 13/02
U.S. Cl. 340—347         24 Claims

ABSTRACT OF THE DISCLOSURE

Apparatus for converting a digital number $n$ to analog signals representative of trigonometric functions of an angle $\theta=360n/N$ degrees. In a cyclic time interval divided into N parts, two trains of pulses are generated, the pulses respectively leading and lagging a reference phase by the angle $\theta$ (or $\pi/2\pm\theta$). The two pulse trains are summed or are used to operate gating devices to provide rectangular wave signals having pulse widths indicative of sine $\theta$ and/or cosine $\theta$. The first train of pulses is generated upon coincidence of the contents of a counter advancing repetitively through N counts and a register storing the number $n$. The second train of pulses is generated upon coincidence of the counter contents and the output of a translator which provides, typically, the N's complement of the register contents.

BACKGROUND OF THE INVENTION

Field of the invention

The present invention pertains to digital-to-analog converters, and more particularly to apparatus for conversion of a digital number $n$ into an analog voltage or current proportional to a trigonometric function, such as sine or cosine, of an angle $\theta$ defined by the relation $n/N=\theta/2\pi$ or, obviously, $n/N=\theta/360$ if $\theta$ is expressed in degrees of arc instead of radians. The invention particularly pertains to apparatus of this character in which the analog information takes the form of alternating voltages or currents of fixed phase, the analog information residing in the amplitude of the voltage or current waves.

Description of the prior art

It has been heretofore proposed to generate alternating voltages or currents of amplitudes representative of trigonometric functions of angles expressed in digital numbers by means of tapped transformers. Such apparatus is disclosed for example in applicant's U.S. Pat. No. 2,849,668 and No. 2,967,017, which are assigned to the assignee hereof.

SUMMARY OF THE INVENTION

In accordance with the invention instead, such voltages or currents are generated by means of pulses and with the help of counting, gating and delay circuits.

BRIEF DESCRIPTION OF THE DRAWINGS

In the accompanying drawings,
FIGS. 12 to 14 are sets of waveforms useful in explaining certain of the embodiments of FIGS. 3 to 11;
FIG. 15 is a vector diagram useful in explaining certain embodiments of the invention employing pulse stretching;
FIG. 16 is a diagram of a translator which may be used in certain embodiments, such as that of FIG. 3;
FIG. 17 is a diagram of another form of translator circuit suitable for use in the invention;
and
FIGS. 18 and 19 are respectively diagrams of adding and subtracting circuits, such as may be employed in the embodiment of FIG. 3 among others.

DESCRIPTION OF PREFERRED EMBODIMENTS

Figure 1:
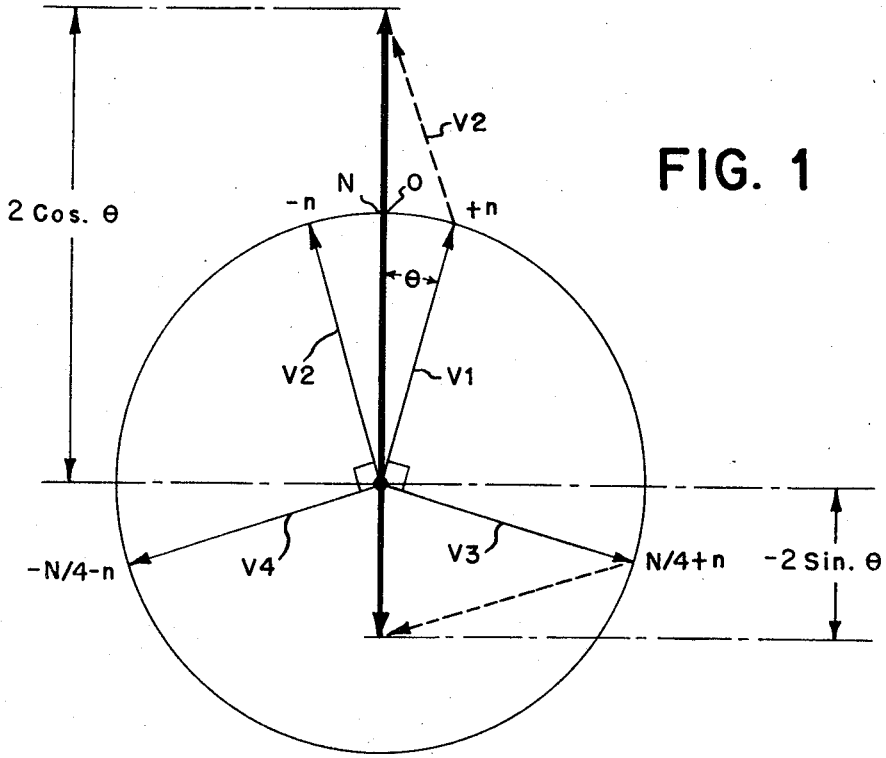
FIG. 1 is a vector diagram useful in explaining embodiments of the invention using summing for function generation.

In Fig. 1 the vectors V1 and V2 represent two sinusoidal oscillations, currents or voltages, of the same frequency and amplitude, leading and lagging a zero reference phase in the cycle by equal angles $\theta$. The vector sum of these two oscillations is clearly seen to be $2\cos\theta$, assuming the vectors to be of unit amplitude. If V3 and V4 are two similar vectors at the phases $\pi/2+\theta$ and $-\pi/2-\theta$, their sum is seen to be $-2\sin\theta$. The minus sign, while it must be dealt with, is unimportant. It can be eliminated by reversal of a pair of conductors in the system.

In accordance with the invention, in one of its aspects, a cycle as indicated by the circle in FIG. 1 is identified with the time interval over which a pulse generator develops a number N of equally spaced pulses. This time interval may be denoted $1/F$, F being the frequency in cycles per second at which the complete count is repeated. The cycle is accordingly composed of N parts, 1000 for example, and a number $n$ ranging from 0 to N therefore defines an angle $\theta$ in degrees of arc according to the relation $\theta/360=n/N$. The vectors V1, V2, V3 and V4 of FIG. 1 therefore occur at the counts $n$, $N-n$ (or, more simply stated, $-n$), $N/4+n$ and $-N/4-n$ in the cycle of N pulses or "counts." The vectors at $-N/4-n$ also may be expressed as being at the count of $3N/4-n$. The invention provides apparatus which develops separate trains of pulses at the $n$ and $-n$ phases of the cycle, or at the $N/4+n$ and $-N/4-n$ phases, or at all four phases. In accordance with one particular aspect of the invention, the pulses of the first pair of pulse trains are vectorially combined, for example in a summing network, to provide a voltage or current cyclical at the frequency F, of fixed phase, and in which the component of F frequency is proportional to cos $\theta$.

The second pair of pulse trains similarly vectorially summed give a similar voltage or current, also of fixed phase, in which the component of F frequency is proportional to sin $\theta$.

Figure 2:
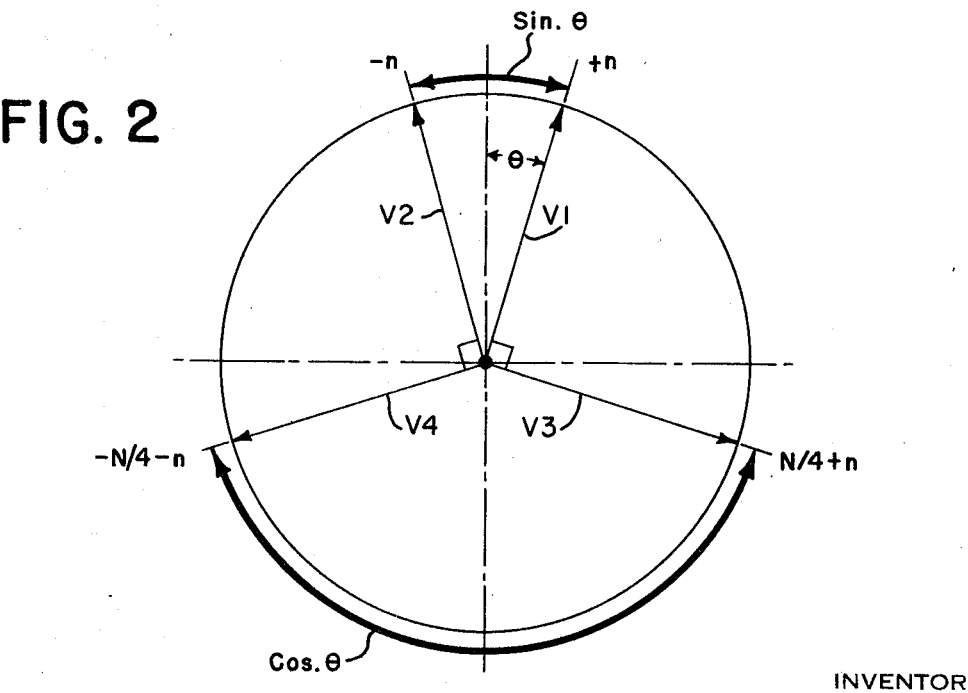
FIG. 2 is a vector diagram useful in explaining embodiments of the invention using gating for function generation.

Referring now instead to FIG. 2, there is shown a diagram including the same four vectors V1 to V4 as in FIG. 1. In accordance with the invention as depicted in FIG. 2 however, the pulse trains are not summed in pairs. Instead, the pulse trains of each pair are employed to control a gate to which is applied an electric signal of suitable form—a D.C. level, pulses or a sinusoidal carrier for example. The rectangular wave cyclical at the rate F which passes through the gate includes a fundamental component which when suitably phase detected against a signal of F frequency, yields a signal whose amplitude is proportional to sin $\theta$ for the pulse trains V1 and V2 (i.e. those at $+n$ and $-n$ counts). For the pulse trains V3 and V4 at $N/4+n$ and $-N/4-n$ counts, this amplitude is proportional to cos $\theta$.

Figure 3:
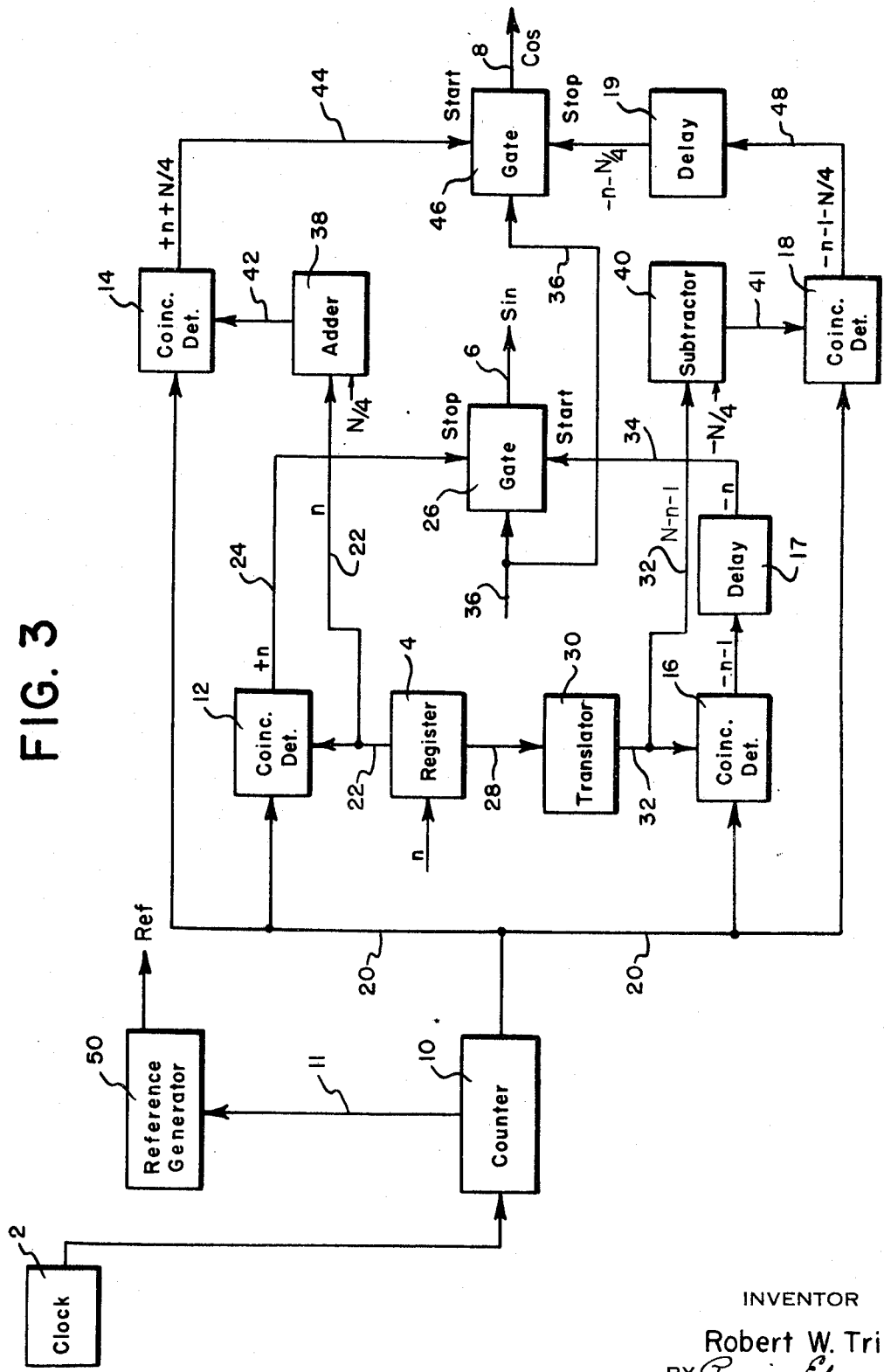
FIG. 3 is a block diagram of an embodiment of the inventive digital-to-analog converter using gating to convert a digital number $n$ to analog signals representing trigonometric functions of an angle $\theta=360n/N$ degrees, where N is a constant.

FIG. 3 is a block diagram of an embodiment of the invention which produces from the pulses of frequency NF developed in a pulse generator or clock 2 and from a number $n$ between zero and N, which is stored in a register 4, signals at output channels 6 and 8 representative respectively of the sine and cosine of the angle $\theta = 2\pi n/N$. For this purpose, the circuit of FIG. 3 includes a counter 10 to which the pulses of the clock 2 are continuously supplied. The counter develops a count varying from zero to $N-1$ and then resetting to zero as indicated at waveform $a$ in FIG. 12. The changing count thus existing in the counter is supplied in parallel to four coincidence detection circuits 12, 14, 16 and 18 by means of a channel diagrammatically indicated at 20. The channel 20 includes conductors sufficient to present, in the number system adopted, the state of the count. If for example $N=1000$ in decimal numbers and if a binary coded decimal system is adopted for presentation of the count to the coincidence circuits, the channel 20 may include twelve pairs of conductors, four pairs for each of the three decimal digits present in the count.

A number $n$ representative of the angle of which it is desired to generate the sine and cosine is introduced into the register 4 in any suitable manner, manually or from a computer for example. The register presents the number $n$ to coincidence detector 12 via a channel 22 and to a translator 30 via a channel 28, the channels 22 and 28 being of the same nature as the channel 20. At coincidence, which occurs once on each of the cycles of frequency F and at the time of the $n$th pulse in that cycle, the circuit 12 develops a pulse which is delivered by a line 24 to a gate 26. The symbol $+n$ applied to line 24 indicates that the pulse on that line occurs at the phase $+n$ of the cycle $1/F$. Cf. FIGS. 1 and 2.

The count stored in the register 4 is also presented via a channel 28 similar to the channel 22 to a translater 30. The translator is a device which converts the number $n$ into a number which may be either $N-n$ or, more conveniently, $N-n-1$. Suitable devices for this purpose are well-known. For translation of $n$ to $N-n-1$, FIG. 16 illustrates apparatus suitable for effective translation of one digit in the number $n$ when that number is presented to the translator in binary form. FIG. 17 illustrates apparatus for effecting that translation when $n$ is in binary coded decimal form. By operation of the translator 30, an output channel 32 therefrom, which may be similar to the channels 20, 22 and 28, presents to the coincidence circuit 16 the number $N-n$ or $N-n-1$. The circuit 16 consequently delivers an output pulse to gate 26 over a line 34 when the counter 10 contains the count equal to the number presented to coincidence circuit 16 by translator 30. If the translation is to $N-n-1$, the output of coincidence detector 16 is a pulse at the phase $-n-1$, i.e. one pulse earlier than $-n$. This is compensated for by a delay unit 17 inserted in line 34.

The pulses delivered to the gate 26 on the lines 24 and 34 serve respectively to close and to open that gate so that an output signal appears on line 6 during that portion of the cycle $1/F$ between the phases $-n$ and $+n$. The nature of this signal depends upon the signal applied to the input terminal of the gate from a line 36. This input signal may be either a D.C. level, or it may be the clock pulses from the clock 2, or it may be an alternating current voltage of some desired carrier frequency.

Consequently the signal on the line 6 is a gated signal representative of the sine of the angle $\theta$ with $\theta = 2\pi n/N$ radians, as illustrated in FIG. 2 and as explained in conjunction with that figure.

The number $n$ is applied by the channel 22 to an adding device 38 as well as to the coincidence circuit 12 and the number $N-n-1$ is similarly applied by the channel 32 to a subtracting circuit 40 as well as to the coincidence circuit 16. The adding and subtracting circuits 38 and 40 are, like the translator 30, passive combinations of logic which serve respectively to add and to subtract to the members presented to them the number $N/4$. Apparatus of this kind is well-known in the art of digital computers. A simple form of adding circuit operating on binary numbers is shown in FIG. 18 and a similar form of subtracting circuit is shown in FIG. 19.

The adding circuit 38 thus presents to the coincidence circuit 14 on a channel 42, which may be similar to the channel 20, a static number $n+N/4$. Consequently, once per cycle of the counter 10, at the count $+n+N/4$, there is delivered to an output line 44 from the circuit 14 a pulse, and this pulse is employed to open a gate 46 receiving at its input on line 36 the same signal as does the gate 26.

The subtracter 40 presents to detector 18 via a channel 41 the number $N-n-1-N/4$ so that at the $(N-n-1-N/4)$th pulse of the cycle a pulse is delivered by the detector at an output line 48. For brevity, the phase of this pulse is indicated as $-n-1-N/4$ adjacent line 48 in FIG. 3. That phase being one pulse too early, a one pulse delay unit 19 is inserted in the line 48 between detector 18 and the gate 46. The pulse on line 48 serves to close the gate 46.

In consequence, the gate 46 is open from the phase $+n+N/4$ to $-n-N/4$, and the gate delivers on line 8 a gated signal representative of the cosine of the angle $\theta$, as illustrated in FIG. 2 and as explained in conjunction with that figure.

A reference signal generator 50 in FIG. 3 receives from the counter 10 over a channel 11 the pulses at $N/4$ and $3N/4$ phases of the counter cycle and generates therefrom a square wave at the counter cycle frequency, displaced in phase by one quarter of the counter cycle from the counter cycle itself. Pulses at the $N/4$ and $3N/4$ phases may be derived from the counter in various ways, for example at the coincident transitions in suitably selected plural orders of the counter. Alternatively, other methods may be employed to obtain the reference wave at the desired phase.

Figure 12:
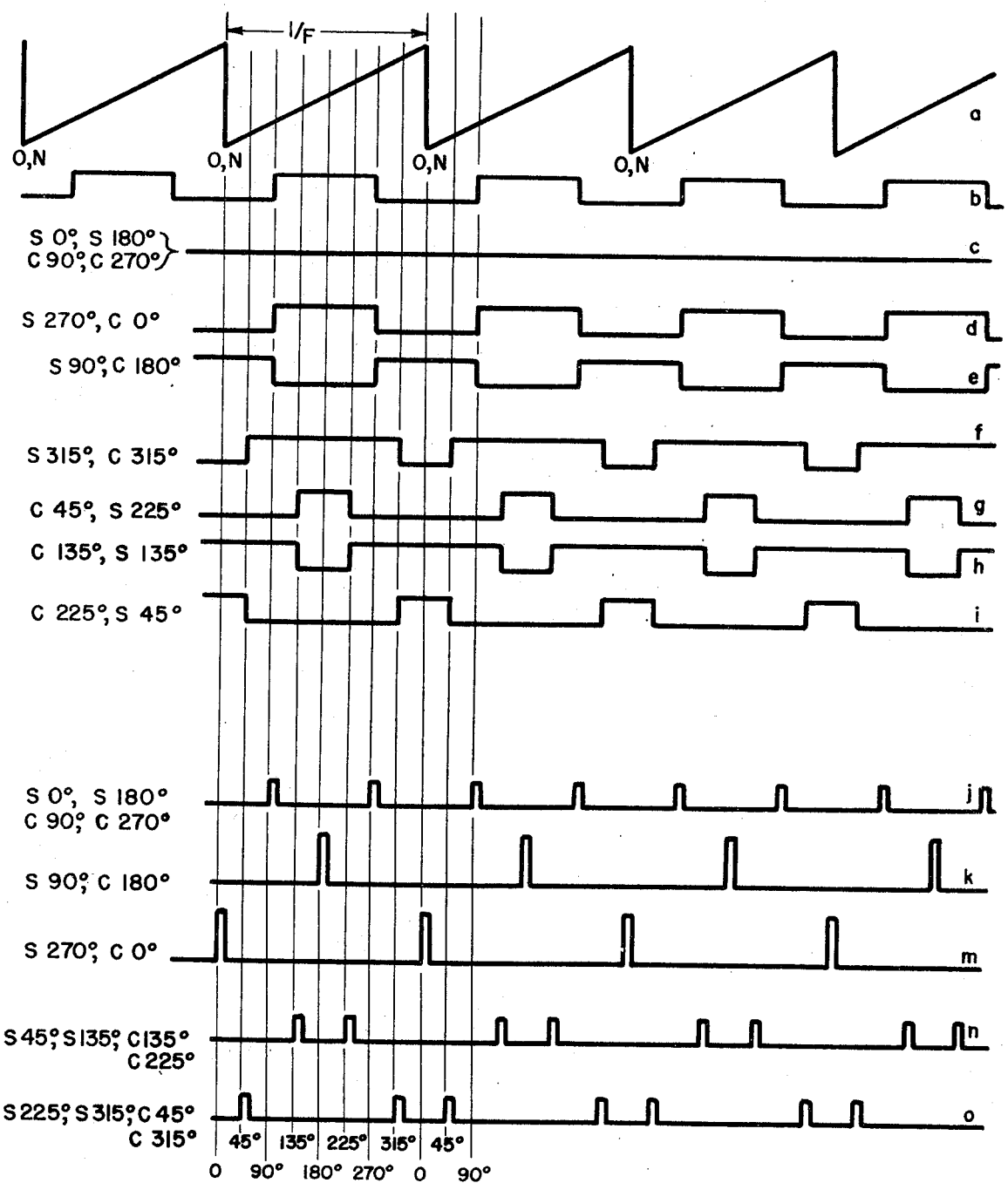

Referring to FIG. 12, waveform $a$ represents the count in counter 10, increasing from 0 to N (actually to $N-1$) and resetting to 0 in a time interval $1/F$. Thus if N is 1000, the counter counts from 0 to 999 by means of pulses having a repetition rate 1000F, the 1000th interval during the cycle being occupied in resetting 999 to 0. While waveform *a* is shown as a continuous slant line, the state of the counter varies digitally.

The reference waveform output of generator 50 is shown at waveform *b*.

Waveform *c* represents the output of the sine gate 26 for 0° and 180° values of the angle where $\theta = 360\mu/N$. It likewise represents the output of the cosine gate 46 for 90° and 270° values of $\theta$. Waveform *d* similarly represents the output of gate 26 for $\theta = 270°$ and the output of gate 46 for $\theta = 0°$. In similar fashion waveform *e* represents the sine channel output at $\theta = 90°$ and the cosine channel output at $\theta = 180°$. Waveform *f* represents the sine channel output at $\theta = 315°$ and the cosine channel output at $\theta = 315°$. Waveform *g* represents the cosine channel output at $\theta = 45°°$ and the sine channel output at $\theta = 225°$. Waveform *h* represents the cosine channel output for $\theta = 135°$ and the sine channel output for $\theta = 135°$, while waveform *i* represents the cosine channel output for $\theta = 225°$ and the sine channel output for $\theta = 45°$.

Phase detection of any one of the signals of waveforms *c* through *i* against waveform *b* will yield a signal whose component of frequency F is of amplitude and polarity proportional to the functions of the angle $\theta$ just recited, for the values of $\theta$ mentioned. Of course, $\theta$ can have any of the values permitted by *n*. The values selected are for illustration only.

FIGS. 1 and 2 are respectively illustrative of what will hereinafter sometimes be called the "summing" and "gating" methods of generating sine- or cosine-representative signals. FIG. 3 thus constitutes an embodiment of the invention in which the gating method of FIG. 2 is employed for the development of both sine- and cosine-representative signals.

Figure 4:
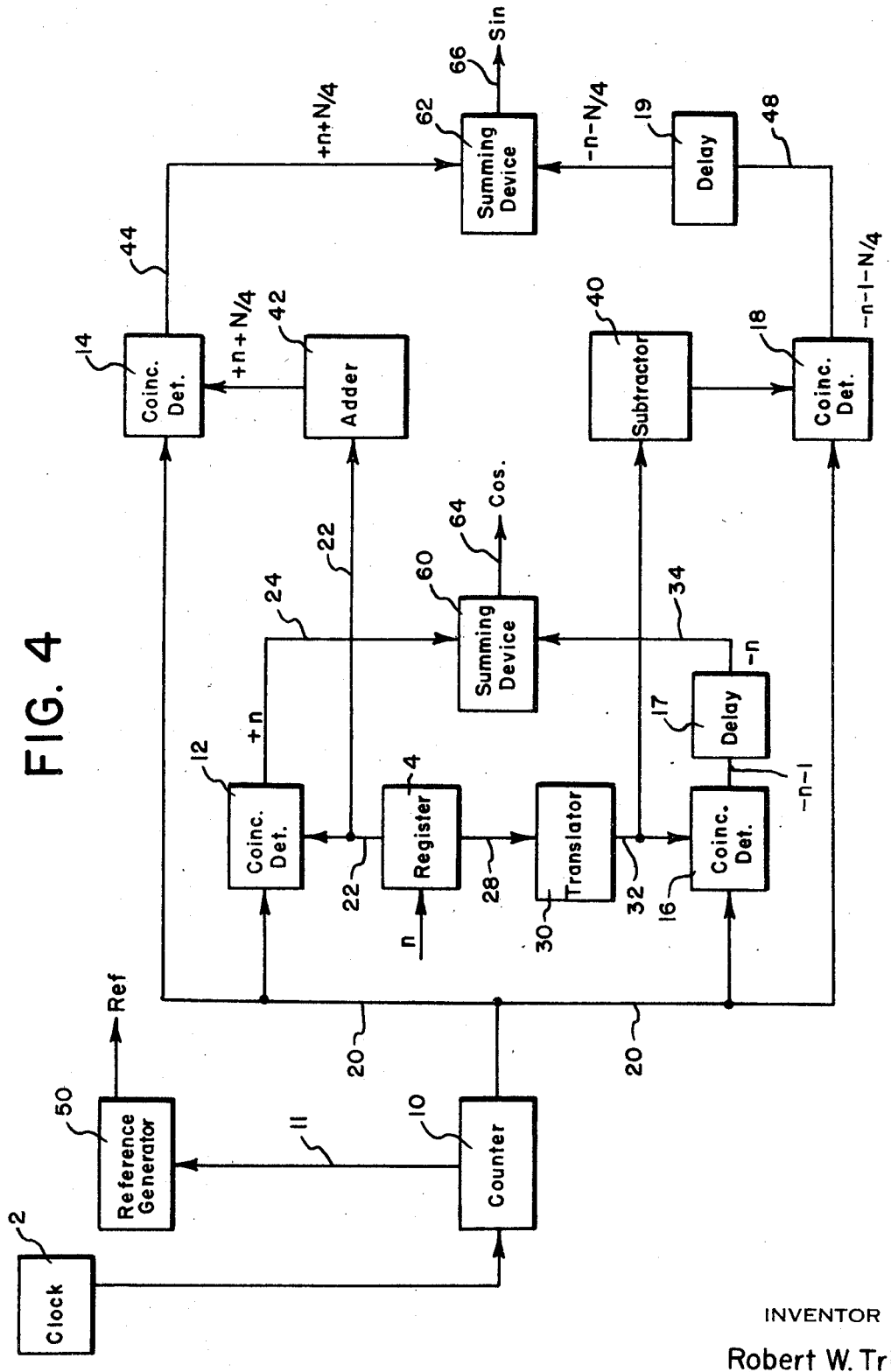
FIG. 4 is a block diagram of an embodiment of the inventive digital-to-analog converter wherein analog signals representing trigonometric functions are produced by summing.

FIG. 4 is a block diagram of another embodiment of the invention which operates by the summing method of FIG. 1 instead of the gating method of FIG. 2. The apparatus of FIG. 4 is the same as that of FIG. 3, except that summing devices 60 and 62 replace the gates 26 and 46 of FIG. 3, the source 36 of a signal to be gated being moreover dispensed with. The summing devices 60 and 62 may be any of various well-known devices, such as summing networks or amplifiers.

The summing device 60 supplies at its output line 64 the vector sum of the pulse trains at the $+n$ and $-n$ phases, which sum represents $2 \cos (2\pi n/N)$ radians. The summing device 62 supplies to its output line 66 the vector sum of the pulse trains at $n+N/4$ and $-n-N/4$ phases, which sum represents $2 \sin (2\pi n/N)$ radians. FIG. 4 thus constitutes an embodiment employing, for both the sine and cosine channels, the "summing" method of FIG. 1.

Waveforms *j*, *k*, *m*, *n*, and *o* in FIG. 12 illustrate, for the same values of *n* and $\theta$ applying to waveforms *c* through *i* (pertaining to FIG. 3), the nature of the signals in the sine channel 66 and cosine channel 64 of FIG. 4. In FIG. 12, the letters S and C are abbreviations for sine and cosine, and the degree numbers are those for $\theta$, just as shown opposite the waveforms *c* through *i*. Waveforms *a* and *b* apply to both of FIGS. 3 and 4.

It will be observed that in waveforms *k* and *m*, where the two trains of pulses being summed coincide, the resultant is of double amplitude.

Figure 5:
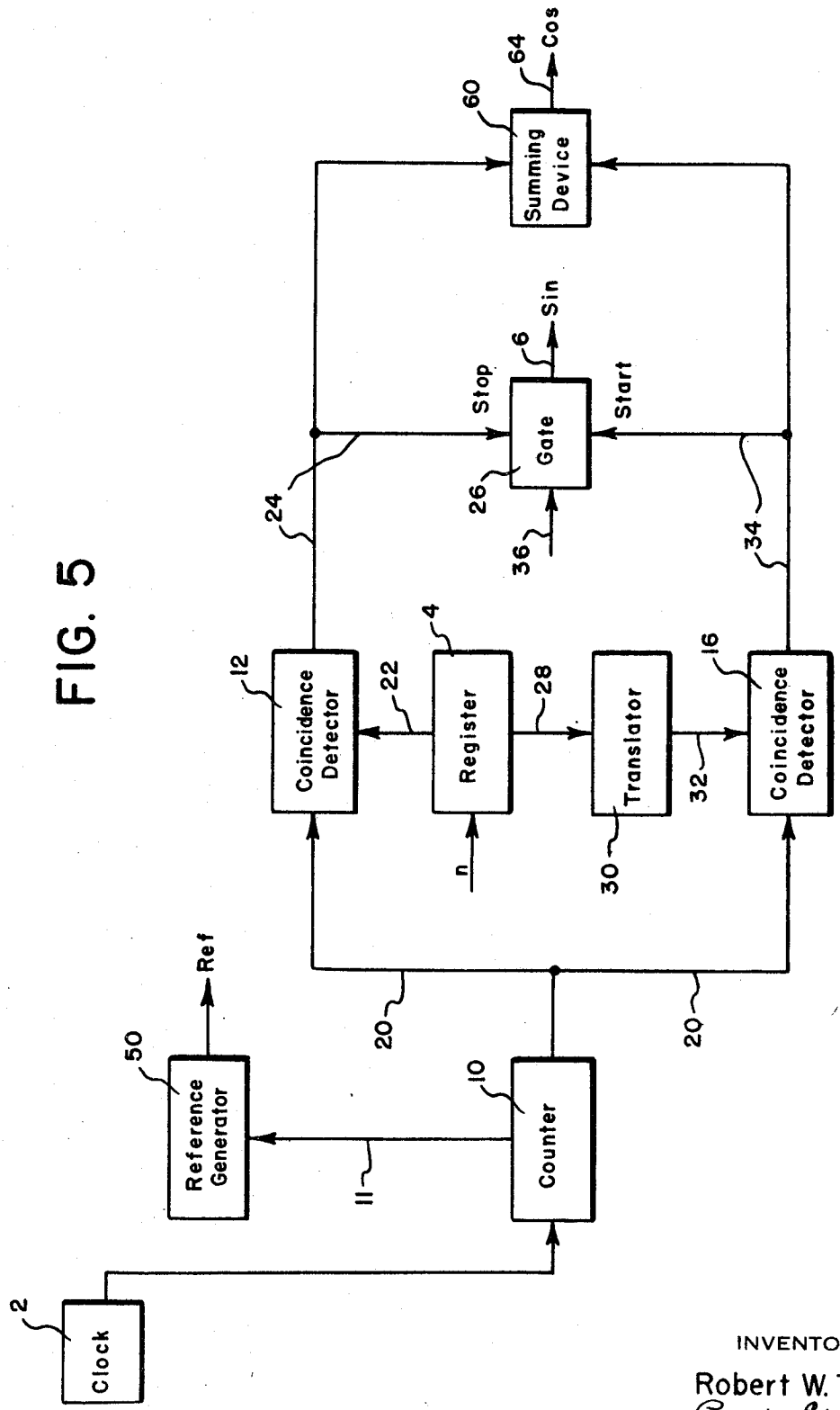
FIG. 5 is a block diagram of an embodiment of the invention wherein a signal representing one trigonometric function is produced by gating and a signal representing another trigonometric function is produced by summing.

The embodiments of FIGS. 3 and 4 employ four coincidence detectors to generate pulses at the $+n$, $-n$, $+n+N/4$ and $-n-N/4$ phases of the counter cycle. It is possible however to generate both sine- and cosine-representative signals form a single pair of the pulse trains, by using the summing method for one function and the gating method for the other. FIG. 5 shows such an embodiment. It produces at an output channel 6 from a gate 26 a signal of the type represented in waveforms *c* through *i* of FIG. 12 as applied to the sine function and at the output 64 of a summing device 60 a signal of the type represented in waveforms *j* through 0 of FIG. 12 as applied to the cosine function.

The devices 26 and 60 of FIG. 5 may, as with other cases of corresponding reference characters throughout the drawing, be identical to the similarly referenced elements of structure in FIGS. 3 and 4. Thus the embodiment of FIG. 5 which operates on the vectors V1 and V2 of FIGS. 1 and 2, employs for the generation of pulses at the $+n$ and $-n$ phases the same apparatus as do the embodiments of FIGS. 3 and 4. Because the difference between $N-n$ and $N-n-1$ may in practice be negligible, the delay units 17 and 19 of FIGS. 3 and 4 have been omitted in FIG. 5.

Figure 8:
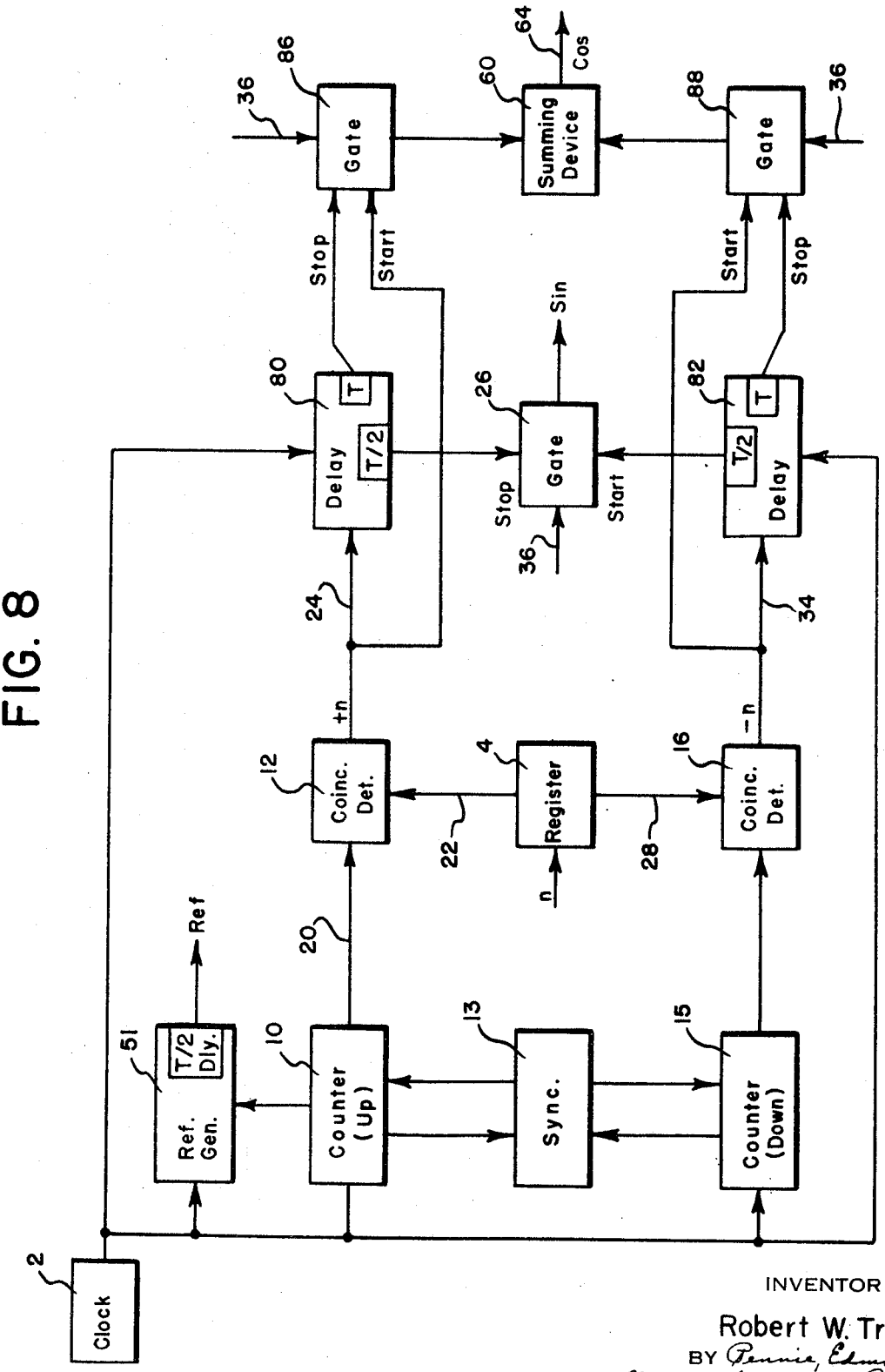
FIG. 8 is a block diagram of an embodiment of the invention wherein both sine and cosine output signals are derived from the same pair of pulse trains.

It should be noted here that because essentially different methods are used in this embodiment for the generation of the sine and the cosine information that the amplitudes of the resulting signals on lines 6 and 64 are quite different from one another. If the sine and cosine outputs are to be used in a single system, it is desirable to make their scale factors more nearly equal. Apparatus for achieving this result is shown in FIG. 8 and will be discussed presently.

Figure 6:
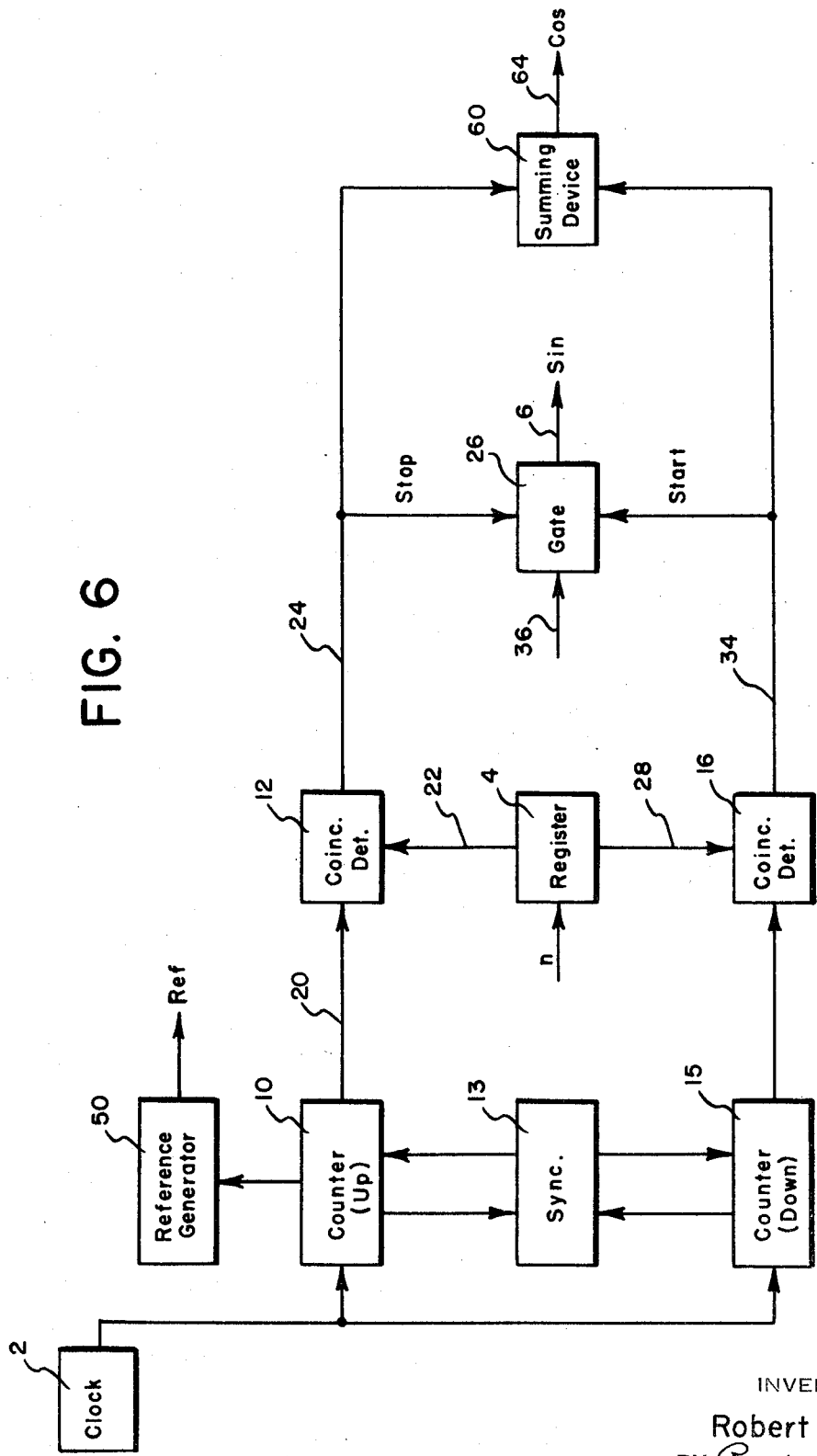
FIG. 6 is a block diagram of an embodiment of the invention using separate up- and down-counters in combination with gating and summing devices to produce sine and cosine signals.

FIG. 6 illustrates another embodiment of the invention in which the output signals are of the same character as those developed in the embodiment of FIG. 5, sine-representative rectangular waves being delivered at a line 6 from a gate 26, and cosine-representative superpositions of pulse trains being delivered at a line 64 from a summing device 60. The gate 26 receives an input signal on a line 36 as in the embodiments of FIGS. 3 and 5, and it is controlled by start pulses on line 34 and stop pulses on line 24 which may be the same and which carry the same signals as the similarly numbered lines 34 and 24 in FIGS. 3, 4 and 5. The summing device 60 has in FIG. 6 the same inputs, from lines 24 and 34, as in FIGS. 4 and 5.

Figure 13:
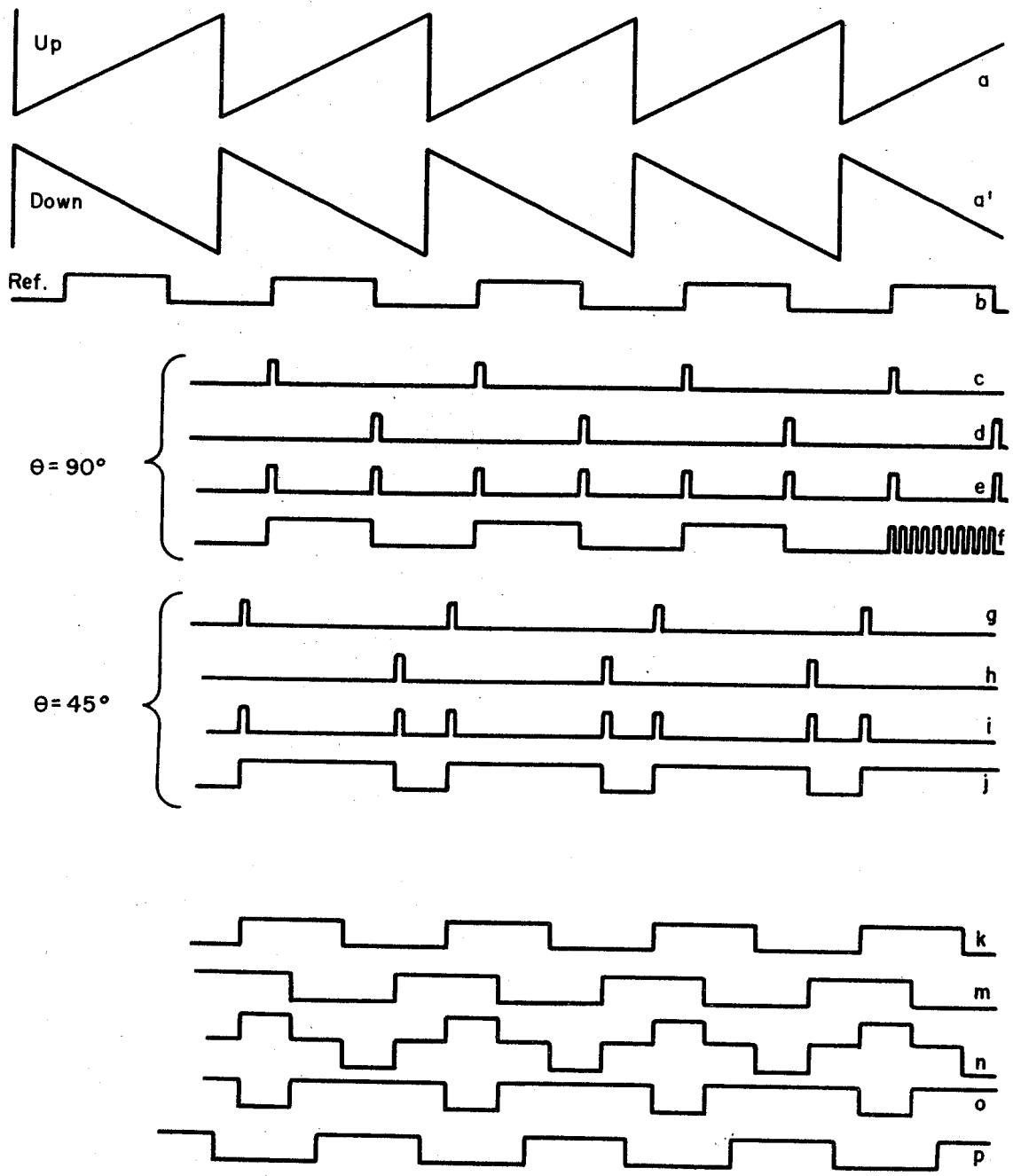

For development on lines 24 and 34 of the pulses at the $+n$ and $-n$ phases of the counter cycle, the embodiment of FIG. 6 moreover employs coincidence devices 12 and 16 and a register 4 which may be respectively identical with the correspondingly identified elements of structure in FIGS. 3, 4 and 5. The translator 30 of those figures is however omitted in FIG. 6. In place thereof the embodiment of FIG. 6 uses a second counter 15 which counts down instead of up, e.g. from 999 down to 0 and then returns on the next clock pulse to 999. Hence it reaches the positive count *n* at the time when the counter 10 reaches the count $N-n$. Referring to FIG. 13, waveform *a* duplicates the waveform *a* of FIG. 12, and represents the state of counter 10 in FIG. 6 just as it does the state of that counter in FIGS. 3 to 5. Waterform *a'* represents the state of counter 15. The two counters are held in the relative phase indicated, resetting together, by operation of a synchronizing circuit 13.

Waveform *b* in FIG. 13 has the same shape, meaning and origin as in FIG. 12; it is the output of the reference generator 50 of FIG. 6. The waveforms *c* and *d* in FIG. 13 represent respectively the pulse trains on lines 24 and 34 of FIG. 6 and, for that matter, in FIGS. 3, 4 and 5 as well on the assumption that $\theta = 90°$, i.e. that the count *n* stored in the register 4 is $N/4$. The result of combining the pulse trains of waveforms *c* and *d* of FIG. 13 in the summing device 60 is represented by waveform *e* in FIG. 13. This waveform is identical to waveform *j* in FIG. 12, and it will be observed that it contains no component of frequency F, as required by the fact that $\cos 90° = 0$. Waveform *f* in in FIG. 13, representing the output of gate 26 in FIG. 6 for $\theta = 90°$, is identical to waveform *d* in FIG. 12. That is, both show the sine-representative output of gate 26, in any of FIGS. 3, 5 and 6, where $\theta = 90°$. At the right end of waveform *f* in FIG. 13 there has been shown the appearance of the output signal from gate 26 on the further assumption that that gate is fed at 36 with pulses of frequency high compared to F.

Waveforms *g* and *h* in FIG. 13 show in contrast the pulse trains on lines 24 and 34 where $\theta = 45°$, and their sum (waveform *i* in FIG. 13) is seen to be identical with waveform *o* in FIG. 12—a signal having a component at the F rate whose amplitude is proportional to cos 45°.

Waveform *j* of FIG. 13, representing the gated output of gate 26 in FIG. 6, is seen to be identical with waveform *f* in FIG. 12, i.e. to represent the sine of 45°.

Figure 7:
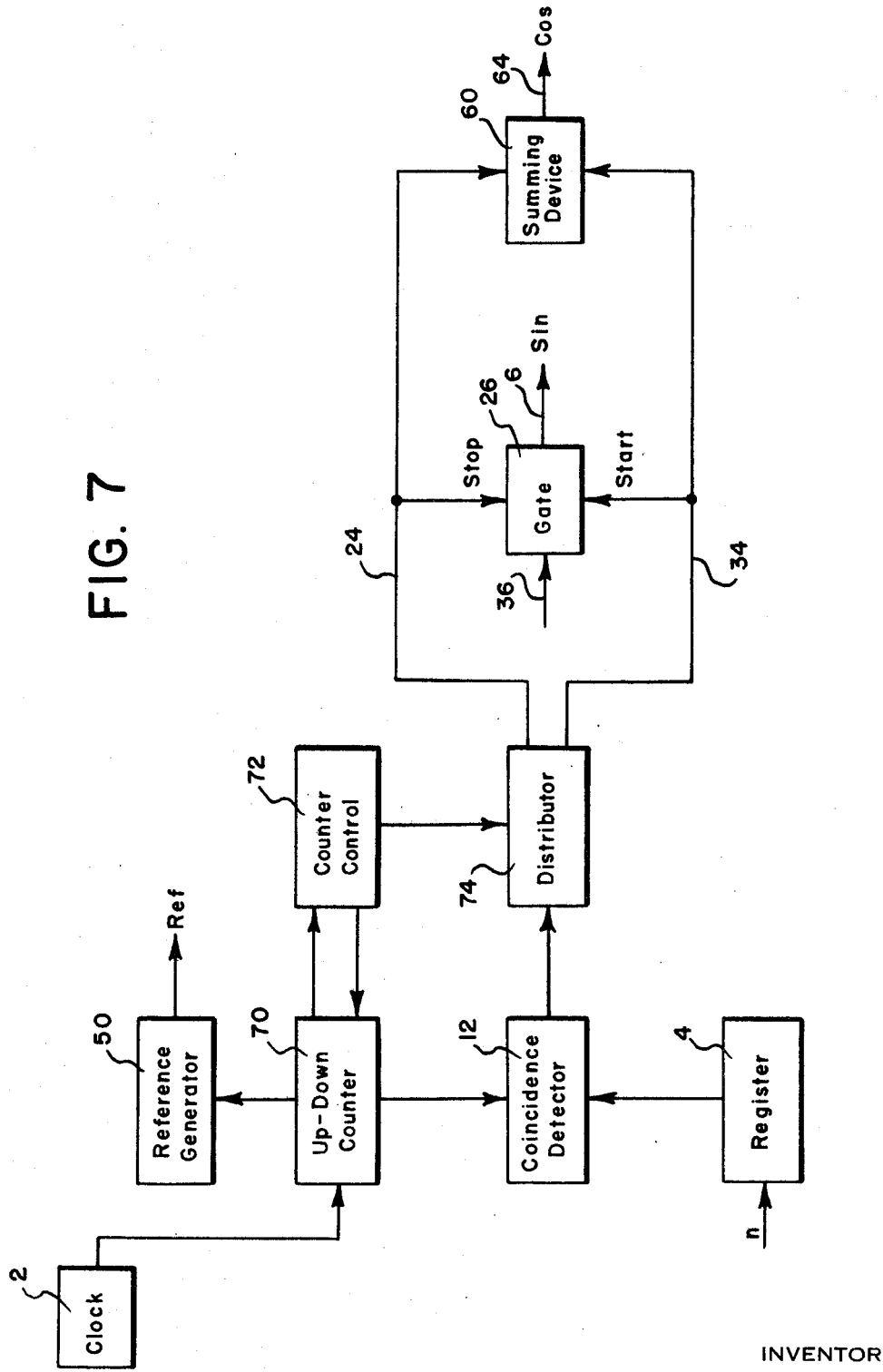
FIG. 7 is a block diagram of an embodiment of the invention using a single up-down counter in combination with gating and summing devices to produce sine and cosine signals.

FIG. 7 illustrates still another embodiment employing the same gate 26 and summing device 60 as do FIGS. 5 and 6 to generate sine- and cosine-representative signals. This embodiment however employs a counter 70 which, unlike those previously described, counts from 0 to N and then, instead of resetting, counts back to 0. Its complete cycle thus covers a time interval $2/F$. A counter control circuit 72 monitors the state of the counter and causes it to reverse its direction of count, without reset, at 0 and N. The operation of the counter is thus as indicated at waveform *a* in FIG. 14.

Again in FIG. 7 the register 4 contains the number $n$ determining the angle $\theta = 2\pi n/N$ of which sine- and cosine-representative signals are to be generated. A coincidence detector 12 detects coincidence between this stored number and the state of counter. Two such coincidences are detected per $2/F$ cycle of the counter. Distributor 74, operating under control of the counter control 72, directs these alternately to lines 24 and 34. Thus line 24 receives pulses when the counter passes through count $n$ on the way up towards N, and line 34 receives pulses when the counter passes through count $n$ on the way down toward zero. The pulses on lines 24 and 34 are shown at waveforms *c* and *d* respectively in FIG. 14. The sum of these, delivered by summing device 60 at line 64, is shown at waveform *e* in FIG. 14. While it contains a component at the fundamental frequency $F/2$ of waveform *a*, it contains none at the frequency of interest F, as is appropriate to a signal representative of the cosine of 90°.

In FIG. 14, waveform *f* shows the output from gate 26 of FIG. 7 for $\theta = 90°$, when waveform *f* is phase detected against the reference waveform *b* it will give a maximum output.

The waveforms *g, h, i* and *j* of FIG. 14 correspond respectively to waveforms *c, d, e* and *f* of that figure, but for $\theta = 45°$ instead of 90°.

It is to be noted that in this embodiment two cycles of the count interval from 0 to N are required to develop one pulse at $-n$ phase and one pulse at $+n$ phase. In other words, the information is developed at half the rate applying to FIGS. 3 to 6. The output signals from gate 26 and summing device 60 of FIG. 7 both contain moreover a component at the frequency $F/2$. This may however be removed by means of a band-pass filter, passing the component of interest at frequency F and rejecting not only multiples thereof but also the subharmonic of frequency $F/2$.

The embodiments of FIGS. 5 and 6 have over those of FIGS. 3 and 4 the advantage that they require only two instead of four coincidence detectors. They have the disadvantage of a large difference in scale factor between the amplitudes of the sine and cosine information developed, one being in the form of a gated signal and the other the sum of two trains of narrow pulses. This difference can be compensated for in various ways, and for many purposes need not be wholly compensated. FIG. 8 illustrates an embodiment of the invention in which, according to a further feature of the invention, the pulses of the pulse trains to be summed are widened or stretched before being summed.

FIG. 8 includes the apparatus shown in FIG. 6 for generating on lines 24 and 34 pulses at the phases $+n$ and $-n$. Instead however of summing these two pulse trains in the adding device 60, these pulses are employed to open gates 86 and 88 so as to initiate widened pulses, which are terminated T counts later by signals from delay units 80 and 82 which count a preset number T of clock pulses, starting at the phases $+n$ and $-n$ respectively, before delivering stop signals to those gates.

The result is the formation, on output line 64 from the summing device 60 in FIG. 8, of a signal as shown at waveform *n* in FIG. 13, drawn on the assumption that $T = N/2$ and that $\theta = 45°$. The individual stretched pulse trains deliverd to summing device 60 in FIG. 8 by gates 86 and 88, and replacing the pulse trains *g* and *h* of FIG. 13 on lines 24 and 34, are shown in FIG. 13 at waveforms *k* and *m*. It is to be noted that when the stretched pulses overlap, the summation of the two waveforms is of double amplitude during the phases of overlap.

Since the center of gravity of the pulses in each of the series being summed for development of the cosine-representative signal has been delayed by $T/2$, the opening and closing signals to the sine-developing gate 26 must be delayed in FIG. 8 by the same amount. For this purpose, the delay units 82 and 80 have additional output terminals which, at a count (in those delay units) of $T/2$ after beginning of counting there, send pulses to gate 26 which serve reprectively to open and to close that gate.

The operation of the embodiment of FIG. 8 can be further understood by reference to FIG. 15, which is a vector diagram similar to those of FIGS. 1 and 2. In FIG. 15 are shown the vectors V1 and V2 of FIGS. 1 and 2, occurring at phases $+n$ and $-n$ determined by the value of the number $n$ stored in the register 4 of FIG. 8. For clarity of the drawing, the number $n$ has been assumed in FIG. 15 to be larger than in FIGS. 1 and 2. The phase $-n$ and $+n$ are therefore those of the coincidence pulses on lines 34 and 24 in FIG. 8, and they are hence the phases at which the gates 88 and 86 are opened respectively. These gates each close T counts later, at the phases $-n+T$ and $+n+T$. The pulses stretched to width T which are delivered by gates 88 and 86 to the summing circuit 60 of FIG. 8 are therefore centered on phase $T/2$ after $-n$ and $+n$ respectively, and are indicated in FIG. 15 by vectors V2' and V1' of greater amplitude than V2 and V1. No attempt has been made to indicate by the amount of lengthening of these vectors the increase in amplitude of the fundamental F frequency component present in the widened pulse trains over that present in the pulses on lines 34 and 24.

The vector sum of V1' and V2' has been drawn in on FIG. 15 and is labeled $2 \cos \theta$. That sum lies along a shifted reference phase indicated 0', $T/2$ clock pulses later than the original reference phase 0. The output of the gate 26, labeled $\sin \theta$ in FIG. 15, is centered about the substituted reference phase 0', the gate opening at $-n+T/2$ and closing at $+n+T/2$. It will be seen that in FIG. 8 the reference generator 51 includes means to delay the output therefrom by $T/2$ pulses, consistently with the showing of FIG. 15 just described.

Figure 9:
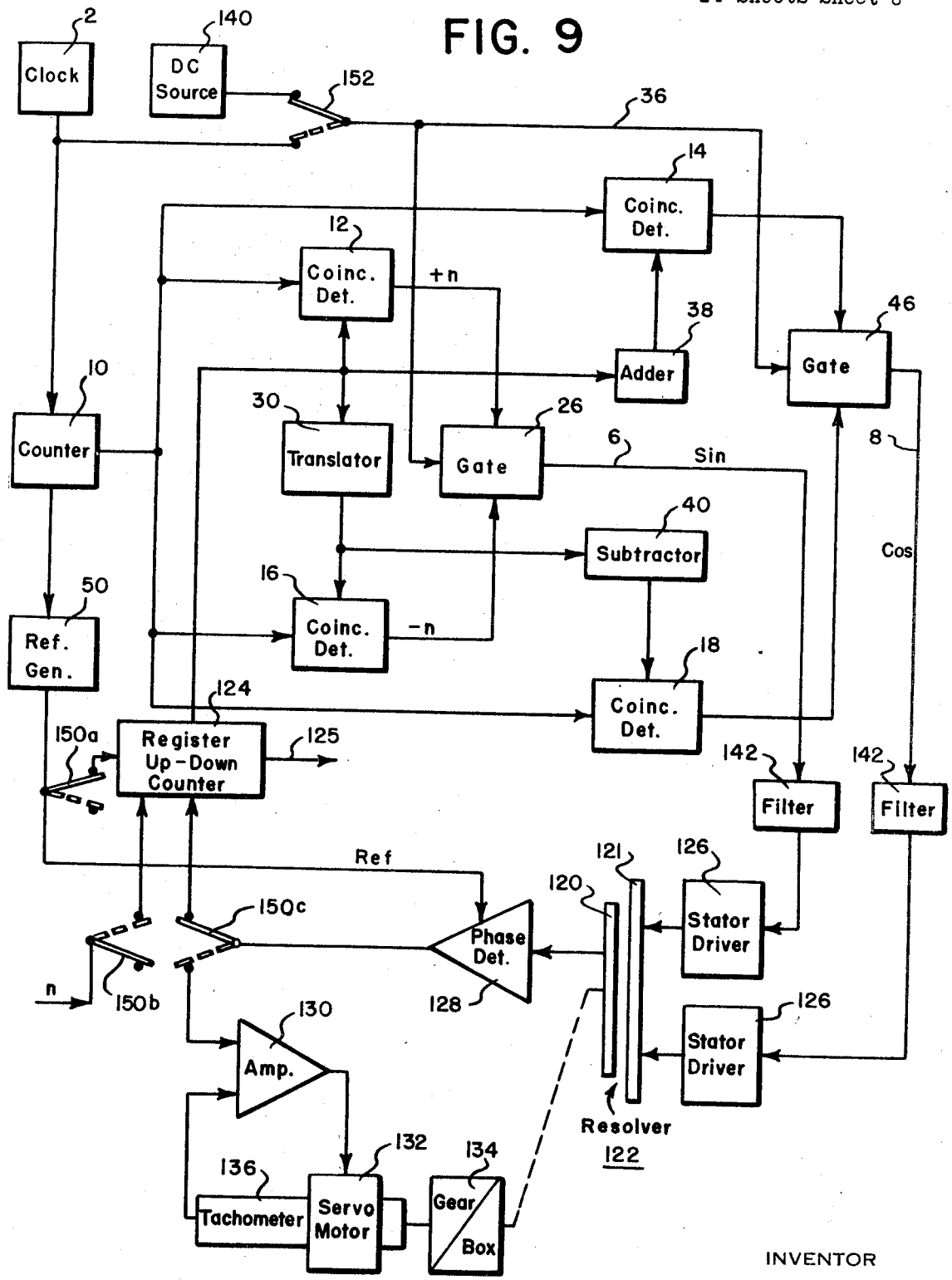
FIGS. 9 and 10 are block diagrams showing utilization of the digital-to-analog converter of FIG. 3 in conjunction with a position measuring device in a position control and readout system.
Figure 10:
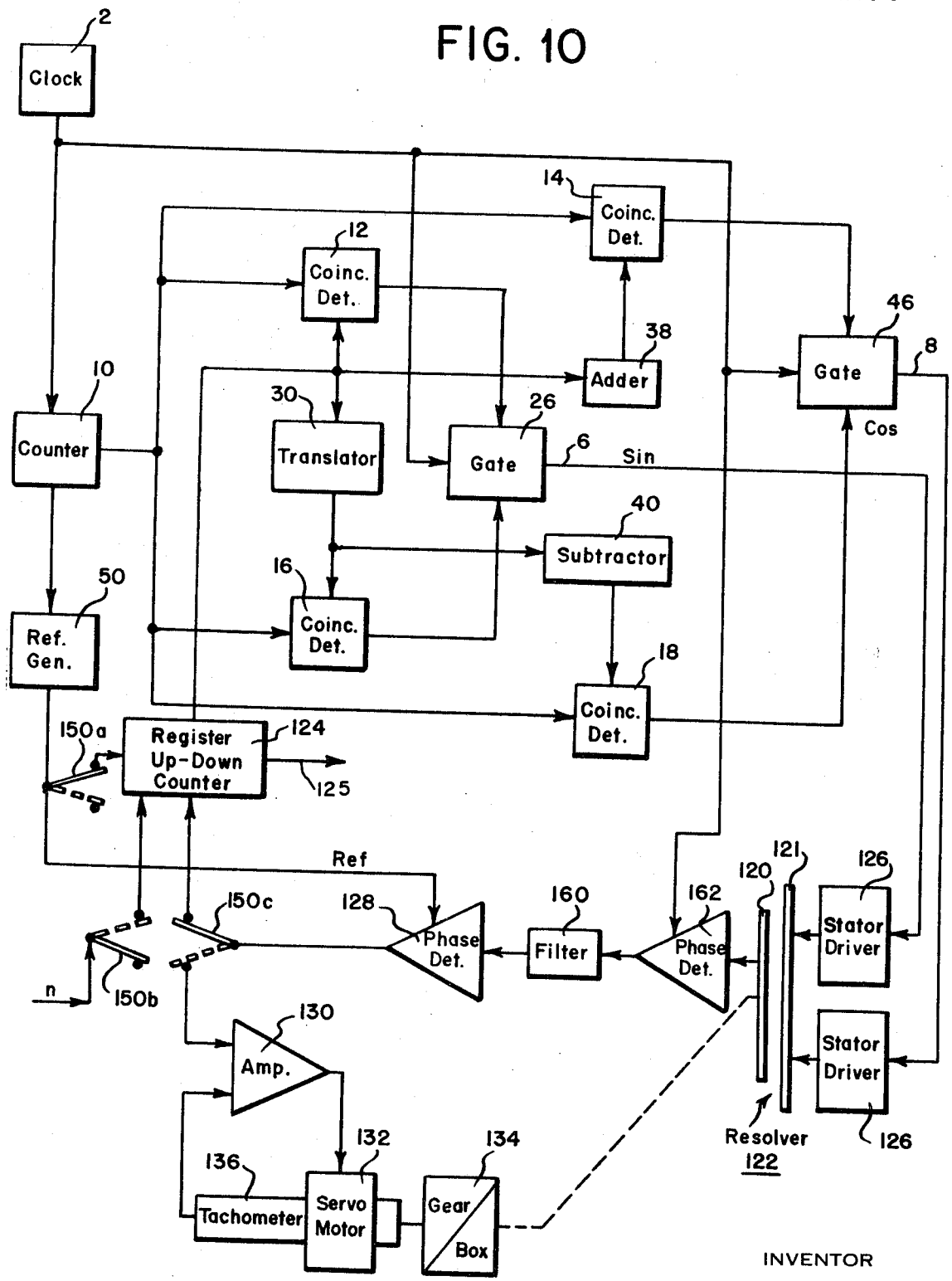

FIGS. 9 and 10 show embodiments of the invention which can be used either to drive the rotor 120 of a resolver generally indicated at 122 to an angular position defined (within an angular cycle of the resolver which may be a fraction of 360°) by a number $n$ stored in a register-counter 124, or to develop in the device 124 a count constituting a digital read-out 125 of the instantaneous position of the rotor 120.

The resolver may advantageously be a multi-pole position measuring transformer (either linear or rotary) as marketed under the registered trademark "Inductosyn" and as described, for example, in U.S. Pat. No. 2,799,835. Such a resolver includes on one member, advantageously the stator, two windings in space quadrature of the pole cycle of the resolver, as disclosed in detail in that patent. This member is indicated at 121 in FIGS. 9 and 10, and the space quadrature winding thereof are energized with currents conforming to the sine- and cosine-representative signals produced in accordance with the invention.

FIGS. 9 and 10 include the apparatus shown in FIG. 3, interconnected with the signal channels and lines of FIG. 3, but with the register-counter 124 replacing in FIGS. 9 and 10 the register 4 of FIG. 3. FIGS. 9 and 10 include, in addition, the resolver 122 already mentioned, stator driver amplifiers 126, a phase detector 128, a servo-amplifier 130, and a servomotor 132, which may be coupled to the movable member 120 of the resolver through a gear box 134. A tachometer 136 is shown providing a control on the gain of amplifier 130.

FIG. 9 also includes a D.C. source 140, filters 142 in the sine and cosine signal lines 6 and 8, and a set of ganged switches 150a, 150b and 150c, all of which occupy either the full line position shown therefor, or the phantom position shown therefor. In addition, FIG. 9 includes a switch 152, which is independent of the switch 150, and by means of which the input line 36 to the gates 26 and 46 can be energized, either with clock pulses from the pulse generator 2 or with a direct current voltage from the source 140.

When the switches 150a, 150b and 150c are in the phantom position shown therefor, the register-counter 124 functions as a register to store a number $n$ applied to it through switch 150b. The apparatus then functions in the manner described in conjunction with FIG. 3 to develop on the lines 6 and 8 voltages representative of the sine and cosine of the angle $\theta = 2\pi n/N$ in the manner hereinabove described in detail. In particular, if the switch 152 connects the line 36 to the source 140, the signals on the lines 6 and 8 will be rectangular waves having the fundamental frequency F. The filters 142 serve to remove harmonics of F. The phase detector 128 then receives the net voltage induced in the winding of the secondary member 120 and it also receives the reference voltage from the generator 50. Its output is then a direct current voltage whose amplitude is proportional to the position error of the member 120 and whose sign indicates the sense of that error. This error voltage operates through the servo loop shown to drive the member 120 to the position at which the error voltage falls to zero.

If the switch 152 is connected instead to the clock 2, the operation of the system is essentially the same. The filters 142 will remove not only harmonics of the F frequency but, obviously, the components at NF (the clock pulse frequency) and harmonics thereof.

When the switches 150a, 150b and 150c are instead set to the full line position shown for them, the apparatus of FIG. 9 serves to provide in the device 124 a digital signal 125 indication of the position of the movable resolver member 120, however assumed or imposed. The error signal output of the phase detector 128 serves to shift the count in the device 124, by one count per modulation cycle F, until that error voltage goes to zero. It will be seen that switch 150a applies the reference voltage of frequency F to the device 124, thus controlling the change in count in the device 124 to one count per cycle of frequency F.

The apparatus of FIG. 10 performs the same functions as those described in conjunction with FIG. 9. It includes instead of the filters 142 a single filter 160 between the secondary member of the resolver and the phase detector 128, and it also includes an additional phase detector 162 to permit recovery of the modulation at F frequency to which the phase detector 128 is to respond. This is necessary because in the embodiment of FIG. 10 no D.C. source 140 is shown for application to the gates 26 and 46, and because the filter 160, downstream of the resolver having inductively related primary and secondary members, has replaced the filters 142 which in FIG. 9 are upstream of that device. The phase detector 162 consequently receives the clock pulses as a reference for the performance of its phase detection function.

Figure 11:
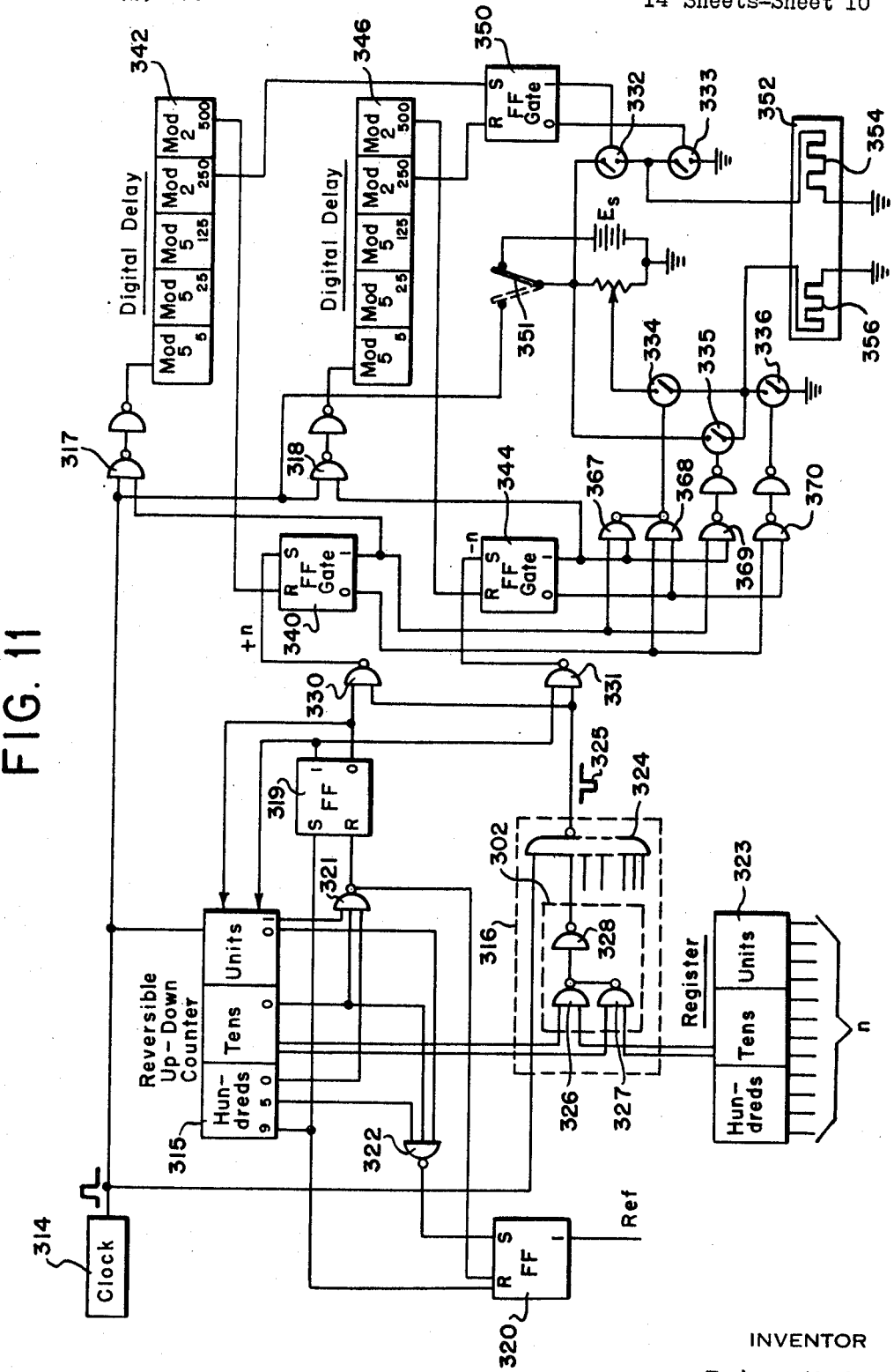
FIG. 11 is an electrical schematic diagram of a digital-to-analog converter corresponding to the embodiment shown in block diagram form in FIG. 8.

FIG. 11 is a more detailed block diagram of an embodiment of the invention employing the gating method for development of a sine-representative signal and employing the summing method, with pulse stretching, for development of the cosine-representative signal. Thus FIG. 11 shows a system of the character shown in FIG. 8. FIG. 11 also shows application of the apparatus of FIG. 8 to energize the space quadrature primary windings of a position measuring transformer such as a resolver, advantageously of the multi-pole type marketed under the registered trademark "Inductosyn." Such multi-pole resolvers are described in U.S. Pat. No. 2,799,835. The system of FIG. 11 will be described on the assumption that $F=2$ kc. and $N=1000$, although it is of course not limited thereto. F is again the frequency over whose cycle the count $n$ varies once between the limits 0 and N.

In FIG. 11, a "clock" 314 generates pulses at the rate of two million per second and delivers them simultaneously to reversible (up-down) counter 315, coincidence detector 316, and controlled gates 317 and 318.

The devices indicated at 317 and 318, and the numerous devices of identical appearance in FIG. 11, are NAND gates. Each of these is a device which will produce a false or "zero" output level when, and only when, all of its inputs are true, or logic "one." It thus gives a logic one output when any or all of its inputs is zero. Logic one may be realized by a positive voltage and logic zero by ground or zero potential.

In FIG. 11, reversible counter 315 comprises three cascaded binary-coded-decimal (BCD) decade counters programmed in a manner described below to count up and down alternately between zero and one thousand, with a thousand represented in the counter as 000. Each full count is taken as one cycle of the reference frequency F. Thus, counting at clock rate of two megacycles per second, and generating one cycle of the reference frequency for each full count of 1000 different states, the counter generates a reference frequency of two kilocycles per second.

The transition of the most significant (hundreds) digit of counter 315 from a 9 to a zero represents the moment at which the counter has gone from 999 to 000, assuming an upward count. This transition is used to set up/down control flip-flop 319 and to reset reference generator flip-flop 320. The flip-flops shown in FIG. 11 are of standard double-rank construction, changing state at the trailing edge of a positive going (zero-to-one) pulse applied to the appropriate input, set or reset. Consequently the nine to zero transition in the hundreds BCD order of counter 315 can be used to set flip-flop 319, the units and tens orders having already gone to zero in generating the carry which causes this transition in the hundreds order.

The two output levels from control flip-flop 319 are used to control the direction of count in counter 315. When flip-flop 319 is in the set condition, counter 315 is directed to count down, and when flip-flop 319 is in reset, counter 315 counts up. Since the counter is reversed while in the 000 state, the next clock pulse throws it into state 999, and when the most significant digit again leaves the 9 state, this time while counting down, the transition signal causes no change in the states of flip-flops 319 and 320, since they are already in the set and reset states respectively.

Flip-flop 319 receives its reset command from gate 321, which senses the transition of the counter through 001. When reset, flip-flop 319 commands counter 315 to count upward, and this takes place when the counter has gone into the 000 state from 001 counting down. When, two clock pulses later, the counter again goes through the 001 state, this time to 002, gate 321 again delivers a reset command. This has no effect, however, since the flip-flop is already in its reset state, and the counter is counting upward.

Thus counter 315 is thus programmed via flip-flop 319 to count alternately up and down. The reference signal, at F frequency, is generated by flip-flop 320, which is reset at the turn-around point of counter 315 at each end of its full count excursion. To complete the reference generation, gate 322 delivers a set command to flip-flop 320 each time the counter passes through its 500 midpoint in each direction of count.

Thus flip-flop 320 generates the reference signal whose frequency is one thousandth of the clock rate, by being reset at the transition of counter 315 from 999 to 000 when counting up, being set via gate 322 when the counter goes through its 500 midpoint while counting down, being again reset, this time via gate 321, at the counter's transition from 001 to 000 when counting down, being again set via gate 322 as the counter goes through 500, this time while counting up, and this pattern repeats itself continuously.

The number $n$, expressed in three-digit BCD format for compatibility with counter 315, is entered into set register 323. The ratio of clock to reference frequencies being one-thousand to one, the number $n$ is the same fraction of a thousand as $\theta$ is of 360°.

The twelve bipolar output levels of set register 323 are compared, stage for stage, with the corresponding output levels of counter 315 in coincidence circuit 316, which comprises twelve sets of three NAND gates each and a thirteen-input NAND gate 324 receiving an input from each of those sets and, at its thirteenth input, the pulses from clock 314. One such set of three NAND gates is shown at the dash-line box 302, and contains gates 326, 327 and 328. The gate 328 functions simply as an inverter. When either or both of gates 326 and 327 has a low output level (i.e. all inputs to such gate being high), the input to gate 328 is clamped low.

The bipolar outputs of each stage of counter 315 and register 323 are represented as 1 and 0, for the set and reset outputs respectively. When a stage is set into the binary "one" state, its set or 1 output is high (positive, or True), and its reset or 0 output is low (ground, or False); and conversely, when reset to "zero," the 1 output is low and the 0 output is high. Hence, in any of the sets 302, the input to gate 328 will be low when the stages of counter 315 and register 323 which are being compared are in the same state, since under this condition of coincidence either gate 326 or 327 is receiving two high inputs and consequently delivers a low output. On the other hand, when the compared stages do not coincide, both gates 326 and 327 are receiving inputs of a high level on one line and a low level on the other; both gates therefore deliver a high output to gate 328. Since gate 328 simply inverts its input, its output to gate 324 is high when, and only when, the compared stages coincide.

The output of coincidence gate 324 remains at the high level as long as any of its inputs is low. When counter 315 reaches the number $n$ which has been loaded into register 323, all twelve stage-pairs under comparison are in coincidence; the twelve inputs to gate 324 are therefore all high, and the next clock assertion pulse acts as a strobe, causing coincidence pulse 325 to be generated. Using the clock to strobe the gate 324 precludes the possibility of generating a false coincidence signal during the finite propagation time within the counter.

Coincidence pulse 325 is delivered to the switching or steering circuit comprising gates 330 and 331, which are controlled by the bipolar outputs of up/down control flip-flop 319. Gates 330 and 331 thus correspond to the distributor 74 of FIG. 7. When flip-flop 319 is reset, its 0 output is high and its 1 output is low, and counter 315 is programmed to count up. At the same time gate 330 is enabled, and gate 331 is inhibited. Thus when counter 315 reaches the number $n$ while counting up, coincidence pulse 325 is blocked at gate 331 but passed through gate 330. Gate 331 is inhibited because, receiving a low input from the output of flip-flop 319, its output is high whether it receives a low or high input from gate 324. Referring to the output of gate 330 as $+n$, to denote the coincidence when counting up, this signal is used to set the flip-flop gate 340 whose 1 output then goes high, enabling gate 317 to pass clock pulses, which are inverted and entered into digital delay unit 342.

When counting down, the output levels of flip-flop 319, which is now in the set state, inhibit gate 330 and enable gate 331 to pass coincidence pulse 325 at the phase $-n$. This is used to set flip-flop gate 344, which in turn enables gate 318 to pass clock pulses for inversion and entry into digital delay unit 346.

Thus digital delay units 342 and 346 start to count clock pulses upon generation of the coincidence signals $+n$ and $-n$ respectively. The flip-flop gates 340 and 344 deliver their assertion (positive 1) outputs until they are reset by their respective units 342 and 346, at which time gates 317 and 318 respectively are inhibited, the delay units are cleared of pulses, and all is in readiness for the next cycle.

The operation is the same within both digital delay units. Three cascaded modulo-5 counters, followed by two cascaded binary (or modulo-2) counters are driven at clock rate to a full count of 500, at which point they reset to zero and stop. The stopping action is obtained by using the final carry at 500 to reset the flip-flops 340 and 344 which control the input gates 317 and 318 to the delay counters. The counter capacity in each delay unit is developed as $5 \times 5 = 25$, $25 \times 5 = 125$, $125 \times 2 = 250$, and $250 \times 2 = 500$. This particular method of generating the delays for stretching of the cosine-representative pulses at phases $+n$ and $-n$ affords a final carry at time $T = 500$, and also provides a convenient output at time $T/2 = 250$ in the form of the carry output from the first of the two binary stages.

The carry outputs at $T/2 = 250$ from delay units 342 and 346 respectively are used to set and reset flip-flop gate 350, for development of the sine-representative signal. These carry outputs are $2n$ counts apart—the spacing in time from $-n$ to $+n$ in FIG. 2.

Since it is necessary to delay the reference signal by a quarter cycle in order to obtain correct phase demodulation of the sine and cosine terms; and since any phase shift of the resultant sine and cosine vectors introduced by the delays must be added to that quarter-cycle delay of the reference term, in order to eliminate phase sensitivity (a basic objective of the invention); then it is clear that by shifting the resultant sine and cosine vectors by a quarter cycle, the additional quarter-cycle delay imposed upon the reference term brings its total delay to exactly a half cycle, which is equivalent to a complete 180° phase reversal, and can be effected without the need for a third delaying network. Since the 0 and 1 outputs of flip-flop 320 are exactly 180° of the reference cycle out of phase with each other, that proper phasing of the reference signal is merely a matter of selecting the proper output line.

In FIG. 11, there is diagrammatically shown at 352 the member of a linear or rotary resolver (such as that of the type described in U.S. Pat. No. 2,799,835), having thereon two windings 354 and 356 in space quadrature of the pole cycle of the resolver. This member may conveniently be the stationary member of the resolver. These windings are, for the position of switch 351 shown in full lines, driven from a supply $E_s$ via controlled switches 332 and 333 for the sine term and 334, 335 and 336 for the cosine terms. Switch operation is controlled by an input logic level; a high input closes the switch, a low input opens it. During the assertion (set) output of flip-flop 350, when the 1 output is high, switch 332 connects the winding 354 to $E_s$, and switch 333 is open. During the period that flip-flop gate 350 is reset, the 0 and 1 outputs open switch 332 and close switch 333, connecting the sine winding 354 to ground.

The combination of gates 367 through 370 constitutes the summing network for the cosine pulse trains. The outputs of flip-flop gates 340 and 344 are used to control the summing gates 367 through 370 in the following manner.

Gates 367 and 368 constitute an exclusive OR gate for the assertion (set) outputs of flip-flop gates 340 and 344; that is, their paralleled output is high whenever there is an assertion output from either gate 340 or gate 344. If both assertions are present, or neither, the output line is low. The output line from gates 367 and 368 controls switch 334, which connects the cosine stator winding 356 to a value of one-half $E_s$. The sine term is $K \sin \theta$, and the cosine term is $2K \cos \theta$. Driving the sine winding with $E_s$ and driving the cosine winding with one-half $E_s$ for each of the two cosine terms brings the two final terms into scale equality.

During those periods where both gates 340 and 344 are in simultaneous assertion (corresponding to the overlap illustrated at waveform $n$ of FIG. 13), gate 369 senses this condition and its output goes low. This is inverted to close switch 335, connecting the cosine winding to the full value of $E_s$ during the period of overlap, thus preserving the scale equality.

Gate 370 senses when neither gate 340 nor gate 344 is set. Its resultant low output at this time is inverted to close switch 336, grounding the cosine winding.

With 351 set to feed the windings 354 and 356 from the D.C. source $E_s$, they are driven at the F frequency. With switch 351 in its left-hand position, as indicated by dashed lines in the figure, they are driven by pulse trains at the clock, or carrier, frequency. This would be desirable in a system wherein a data sampling rate of, for example, 20 cycles per second were to be employed. In such a case, the clock, or carrier, frequency would be set at 20 kilocycles per second, and switch 351 would be placed to the left so as to drive the stator windings at the higher rate, in order to achieve more efficient transformation within the Inductosyn itself.

FIG. 16 illustrates a form of apparatus for use in the translator 30 of FIGS. 3 to 5 when the translator is to handle numbers in binary form, FIG. 16 showing for such a translator the apparatus necessary to effect translation of a single binary digit to its binary one's complement. FIG. 16 thus shows two conductors constituting the pair which receive from the left, say, the value of one binary digit in the register 4 of FIG. 3. If the binary digit is zero, the upper conductor will be positive, say, and the lower conductor at ground. If the binary digit is one, the upper conductor will be at ground and the lower conductor will be positive, say. Interchange of the two conductors at their input (at the right in FIG. 16) to the coincidence detector 16 of FIG. 3 interchanges the value of the binary number presented to the coincidence detector and thereby effects generation of the one's complement.

FIG. 17 shows, for a translator operating on numbers in binary coded decimal form, apparatus sufficient to generate the nine's complement of one digit of such a number. If the four binary orders $2^0$, $2^1$, $2^2$ and $2^3$ in one binary coded decimal digit of the number $n$ to be translated are denoted D, C, B and A respectively, and if those four orders in the desired nine's complement digit are denoted 1, 2, 4 and 8, then the apparatus shown in FIG. 17 will effect the desired translation. In FIGS. 17 through 19, the barred notation identifies the second or other conductor of each of the pair required for any binary digit. It will be seen that the apparatus in FIG. 17 comprises nothing more than conductors with or without crossovers for development of the $2^0$ and $2^1$ binary digits in the complement, and that for the $2^2$ and $2^3$ orders in the complement digit, it employs NAND gates of the type described in conjunction wtih FIG. 11. The combination of three such NAND gates for development of the $2^2$ order in the complement functions in the manner described for the combination of gates 302 in FIG. 11. In the combination of two NAND gates for development of the $2^3$ complement digit, the gate having one input simply inverts the output of the gate having three inputs.

FIGS. 18 and 19 show the same physical structure as that employed in FIG. 17 for obtaining the $2^0$ and $2^2$ binary digits in the complement of one BCD digit. This structure can be used, as shown in FIGS. 18 and 19, to effect addition and subtraction respectively of $N/4$ when the register 4 of FIG. 3 is set up in binary form having ten bits for storage of a ten-bit binary number. In that case, the addition and subtraction of the quantity $N/4$ involves changes in only the two coarsest bits, i.e. those of the orders $2^8$ and $2^9$. These are the orders involved in FIGS. 18 and 19, the inputs from register 4 being applied at the left in these figures and the outputs to the coincidence detectors 14 and 18 being at the right.

Apparatus of the kind shown in FIGS. 16 through 19 and, more generally, the logic of digital numbers is well-known and is extensively discussed for example in R. K. Richards, Arithmetical Operations in Digital Computers, D. Van Nostrand, New York, 1955. For translators, see particularly Chapter VI, pages 179–180. For adders and subtractors, see in the same work Chapter IV, pages 83–86, 113–118 and Chapter VII at page 204.

While the invention has been described hereinabove in terms of a number of preferred embodiments thereof, the invention itself is not limited thereto but rather comprehends all modifications on the departures from those embodiments properly falling within the spirit and scope of the appended claims.

I claim:

1. Apparatus for converting data between digital and analog forms, said apparatus comprising a source of pulses, a pulse counter coupled to the source to pass cyclically in through a range of counts, means to develop a first train of pulses occurring at a phase of the counter cycle leading a reference phase of the counter cycle, means to develop a second train of pulses at a phase of the counter cycle lagging said reference phase, and means to generate electric signals from the pulses in said first and second trains, wherein said means to develop the first train of pulses comprise a register for storage of a count representative of half the separation of said leading and lagging phases and a coincidence detection circuit coupled between the counter and register, and wherein the means to develop the pulses of said second train comprise a translator and a second coincidence detection circuit coupled between the translator and register.

2. Apparatus according to claim 1 wherein said leading and lagging phases are spaced from said reference phase by the same number of pulses from said source.

3. Apparatus according to claim 1 wherein said means to generate signals include a gate opened by pulses of one of said trains and closed by pulses of the other of said trains.

4. Apparatus according to claim 1 including supplementary means to develop third and fourth trains of pulses at phases of the counter cycle displaced respectively by one quarter of the counter cycle from said leading and lagging phases.

5. Apparatus according to claim 4, said supplementary means comprising for said third train of pulses an adder and a coincidence detection circuit coupled between the register and counter, said supplementary means comprising for said fourth train of pulses a subtractor and a coincidence detector coupled between the translator and counter.

6. A system for converting data from digital to analog forms, said system comprising a source of pulses, means providing a digital input, a pulse counter coupled to the source to pass cyclically in through a range of counts, means responsive to said digital input to develop a first train of pulses occurring at a phase of the counter cycle leading a reference phase of the counter cycle, means responsive to said digital input to develop a second train of pulses at a phase of the counter cycle lagging said reference phase, and means to generate analog electric signals from the pulses in said first and second trains, and wherein said means to generate signals include means to sum pulses of said two trains.

7. A system according to claim 6 including means to widen the pulses of said two trains.

8. Apparatus for generating electric signals representative of a function of an angle $\theta = 2\pi n/N$ radians, said apparatus comprising a source of pulses, a pulse counter coupled to that source and adapted to count repetitively between 0 and N, a register adapted to store a number $n$ between 0 and N, a first coincidence detector connected to compare the count present in the register and counter, means to develop a first train of pulses in response to detection of coincidence in said detector, means to develop a count substantially equal to the N's complement of one of said register and counter counts, a second coincidence detector coupled to receive said substantially equal count from said complement developing means and the count from the other of said register and counter, and means to develop a second train of pulses in response to detection of coincidence in said second detector.

9. Apparatus according to claim 8 further comprising means responsive to said first and second trains of pulses for producing electric signals having amplitudes corresponding respectively to two different trigonometric functions of said angle $\theta$.

10. Apparatus for converting data between digital and analog forms, said apparatus comprising a source of pulses, a pulse counter coupled to the source to pass cyclically in through a range of counts, means to develop a first train of pulses occurring at a phase of the counter cycle leading a reference phase of the counter cycle, means to develop a second train of pulses at a phase of the counter cycle lagging said reference phase, and means to generate electric signals from the pulses in said first and second trains, wherein said means to develop the first train of pulses comprise a register for storage of a count representative of half the separation of said leading and lagging phases and a coincidence detection circuit coupled between the counter and register, and wherein said means to develop the pulses of said second train comprise a second counter counting in the opposite direction from the first-named counter, and held in synchronism therewith, and a second coincidence detector coupled between the register and second counter.

11. Apparatus for converting data between digital and analog forms, said apparatus comprising a source of pulses, a pulse counter coupled to the source to pass cyclically in through a range of counts, means to develop a first train of pulses occurring at a phase of the counter cycle leading a reference phase of the counter cycle, means to develop a second train of pulses at a phase of the counter cycle lagging said reference phase, and means to generate electric signals from the pulses in said first and second trains, wherein said counter passes firstly with increasing count through said range of counts and secondly with decreasing count therethrough, and wherein said means to develop first and second trains of pulses comprise a register for storage of a count representative of half the separation of said leading and lagging phases, a coincidence detection circuit coupled between the register and counter, and means to sort to separate circuits successive coincidences detected by the detector.

12. Apparatus for converting digital data to an analog representation of said data, said apparatus comprising:
counter means for counting repetitively through a range of counts,
a register for storing said digital data,
translator means for translating the contents of said register into a signal which is a function of the complement thereof,
means for producing a first train of pulses indicative of coincidence between the contents of said counter means and the contents of said register,
means, separate from said translator means, for producing a second train of pulses indicative of coincidence between the contents of said counter means and the translated contents of said register, and
means responsive to said first and second pulse trains for providing a square wave signal having a pulse width representative of said digital data.

13. Apparatus according to claim 12 wherein said data is in binary coded decimal form, and wherein said translator means provides an output which is the nine's complement of the data stored in said register.

14. Apparatus according to claim 12 wherein said counter has a range of N counts, wherein $n$ designates said digital data, and wherein said translator means provides an output $N-n-1$, said apparatus further comprising means for delaying by one bit said second train of pulses.

15. Apparatus according to claim 14 further comprising:

means for producing a third train of pulses indicative of coincidence between the contents of said counter means and the sum $n+N/4$,
means for producing a fourth train of pulses indicative of coincidence between the contents of said counter means and the difference $n-N/4$, and
gating means responsive to said third and fourth pulse trains for producing a second square wave signal having a pulse width representative of said digital data.

16. Apparatus according to claim 15 further comprising:
means for deriving from said first square wave signal a sinusoidal signal having an amplitude indicative of the sine of the angle $\theta=2\pi n/N$ radians, and
means for deriving from said second square wave signal a second sinusoidal signal having an amplitude indicative of the cosine of the angle $\theta=2\pi n/N$ radians.

17. A system for converting digital data representing an angle into analog signals representative of said data, said system comprising,
first means for generating one pair of pulses symmetrically disposed on each side of a cyclically recurring reference position,
second means responsive to said one pair of pulses for producing a first analog signal representing a first trigonometric function and having an amplitude indicative of the angle represented by said data, and
third means responsive to said one pair of pulses for producing a second analog signal representing a trigonometric co-function of said first trigonometric function and having an amplitude indicative of the angle represented by said data.

18. Apparatus for converting a digital number $n$ to which there corresponds an angle $\theta=360n/N$ degrees, where N is a constant, into analog signals indicative of said number, said apparatus comprising:
means for generating a first train of pulses, each pulse leading by $\theta$ degrees a reference phase cyclically recurring every 360°,
means for generating a second train of pulses, each pulse lagging by $\theta$ degrees said cyclically recurring reference phase,
first means responsive to said first and second trains of pulses for producing a first rectangular wave signal having a pulse width indicative of a first trigonometric function of said angle $\theta$, and
second means responsive to said first and second pulse trains for producing a second rectangular wave signal having a pulse width indicative of a second trigonometric function of said angle $\theta$.

19. Apparatus according to claim 18 wherein said second function is a trigonometric co-function of said first function.

20. Apparatus according to claim 18 wherein one of said means responsive comprises a gate opened by pulses of said first train and closed by pulses of said second train.

21. Apparatus according to claim 18 wherein one of said means responsive comprises means for summing the pulses of said first and second trains.

22. Apparatus according to claim 18 wherein said number $n$ is externally supplied, said apparatus further comprising register means for accepting and storing in digital form said number $n$, both of said means for generating cooperating with said register means.

23. Apparatus according to claim 18, wherein said first and second trigonometric functions are sine and cosine, respectively.

24. Apparatus according to claim 23 further comprising means for producing, from said first and second rectangular wave signals, first and second sinusoidal signals having amplitudes indicative respectively of the sine and cosine of said angle $\theta$.

(References on following page)

References Cited

UNITED STATES PATENTS

| | | |
|---|---|---|
| 3,263,066 | 7/1966 | Seegmiller. |
| 2,863,117 | 12/1958 | Grausten. |
| 2,849,668 | 8/1958 | Tripp _____ 340—347 |
| 2,967,017 | 1/1961 | Tripp _____ 340—347 |
| 3,066,285 | 11/1962 | McCoy _____ 340—347 |
| 3,175,138 | 3/1965 | Kilroy et al. _____ 340—347 |
| 3,223,830 | 12/1965 | Evans _____ 340—347 |

MAYNARD R. WILBUR, Primary Examiner

J. GLASSMAN, Assistant Examiner

U.S. Cl. X.R.

235—92